Dec. 12, 1961  R. P. PROBERT ET AL  3,012,402

VORTEX FLOW REACTION CHAMBERS

Filed July 16, 1957  2 Sheets-Sheet 1

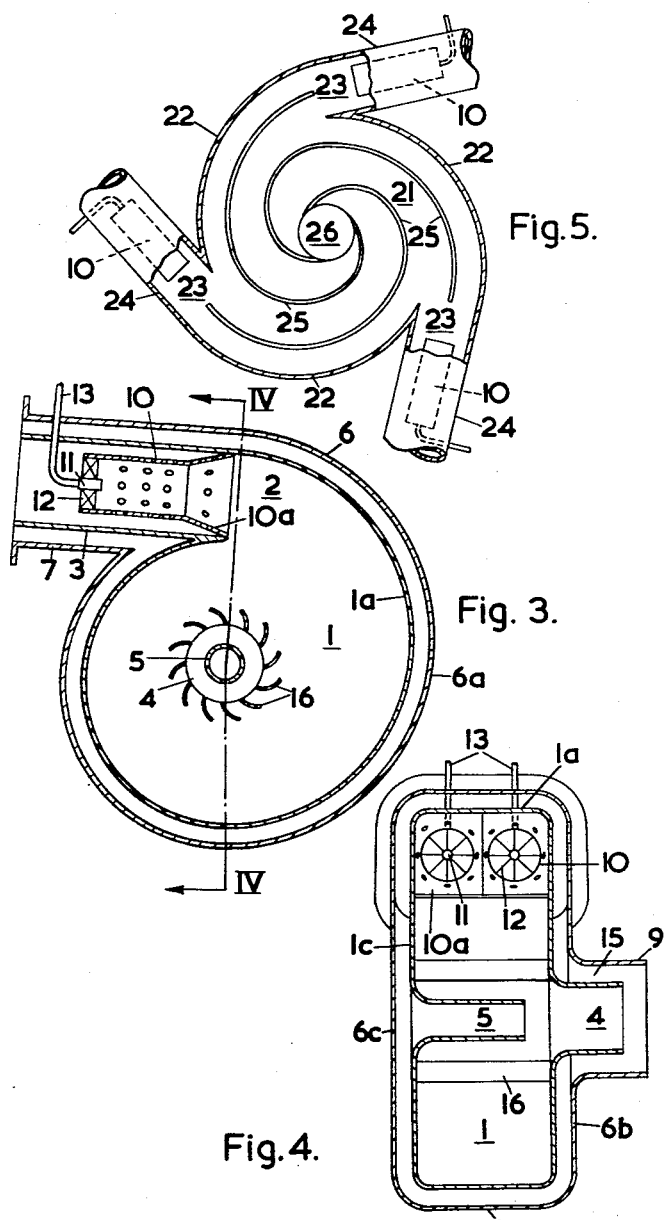

United States Patent Office 3,012,402
Patented Dec. 12, 1961

3,012,402
VORTEX FLOW REACTION CHAMBERS
Rhys Price Probert, Farnborough, and Edwin Cecil Roberson, London, England, assignors to Power Jets (Research and Development) Limited, London, England, a British company
Filed July 16, 1957, Ser. No. 672,165
Claims priority, application Great Britain Aug. 3, 1956
6 Claims. (Cl. 60—39.69)

This invention relates to spiral vortex reaction chambers, i.e., chambers in which chemical or physical reactions are effected between a first fluid and a reactant which may be a second fluid or a finely divided solid material, the first fluid being admitted in a generally tangential direction to the chamber at the periphery, and being caused to flow inwardly therein in a spiral vortex path to a central outlet on the axis of the chamber, and particles of the second fluid or solid being introduced into the chamber and carried around the axis thereof in equilibrium paths under the action of centrifugal force and the drag forces due to the inward movement of the first fluid, and progressively approaching the outlet as the reaction proceeds and the particles are consequently consumed. Examples of such reaction chambers are the combustion chambers described in British patent specifications Nos. 639,468, 639,483, 653,289, 676,208, 676,263, 719,379 and 719,380, and in co-pending patent applications Serial Nos. 584,577, 584,629 and 584,630, but the invention also extends to reaction chambers in which chemical reactions other than combustion, or physical reactions, e.g., solution of the particles of the second fluid or the solid in the first fluid, or evaporation of the particles, are to be carried out.

Reaction chambers of the type specified offer the possibility of exercising very rigid control over the reaction process. For example, the combustion chambers described in the above mentioned co-pending applications are intended to be operated in such a manner that particles or drops of residual fuel oil are incompletely burnt therein, so that the combustion gases discharged from the chamber contain a pre-determined proportion of unburnt carbon, with a view to reducing corrosion by the fuel ash of the blades of the gas turbine to which the gases are supplied. In practice, however, difficulty may be experienced in achieving the degree of control required. This arises from the fact that the flow in the chamber is not strictly two-dimensional. It is found that the flow midway between the opposite side walls of the chamber is turned to a lesser extent than the flow adjacent the walls which is slowed down by frictional effects. Ultimately the faster-moving flow impinges on the chamber peripheral wall, washes out towards the side walls and forces the slower-moving flow into a more steeply curved path. Thus the velocity profile across the width of the chamber between the side walls becomes progressively more uniform, and secondary flows, i.e. flows in a direction transverse to the spiral vortex path, tend to develop. The non-uniformity of the velocity profile and the liability to the development of secondary flows is particularly marked in the region of the chamber outlet where the flow in the spiral vortex path may in consequence even be partially reversed.

According to the invention, a spiral vortex reaction chamber is provided with a vane projecting axially from at least one of its side walls into the interior of the chamber and extending along the spiral vortex path of the fluid flow in the chamber, whereby secondary flows are reduced.

The vane may extend along a spiral extending from the peripheral inlet to the central outlet, and there may be a series of such vanes. The vanes should project across the chamber for a substantial proportion, e.g., at least one third, of its width.

According to an alternative or additional feature of the invention, there may be a ring of vanes around the central outlet, extending across the full width of the chamber between the side walls.

The onset of secondary flow can also be delayed by ensuring a more uniform entry velocity profile. In one arrangement there may be two swirlers of opposite hands, mounted within the inlet duct leading to the peripheral inlet to the chamber, the swirlers swirling the fluid passing therethrough in opposite directions. In the case of a vortex combustion chamber, these swirlers may also constitute flame stabilising baffles. Uniform velocity profiles in the peripheral part of the chamber can also be promoted by the use of a plurality of peripheral inlets as shown, for example, in the above-mentioned British patent specifications Nos. 719,379 and 719,380.

Some embodiments of the invention will now be described by way of example with reference to the accompanying diagrammatic drawings, of which:

FIGURE 3 is a transverse sectional view of another spiral vortex type combustion chamber.

FIGURE 4 is a sectional view of the combustion chamber of FIGURE 3, taken on the line IV—IV.

FIGURE 5 is a transverse sectional view of yet another form of spiral vortex type combustion chamber.

Figure 1:
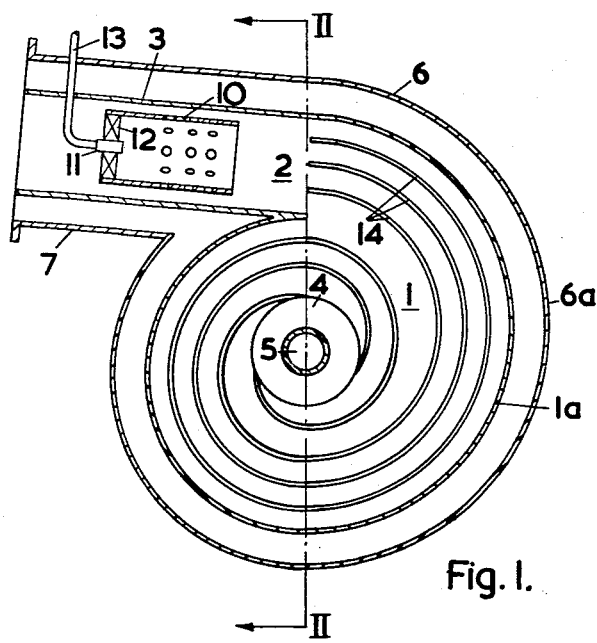
FIGURE 1 is a transverse sectional view of a spiral vortex type combustion chamber suitable for use in a gas turbine plant.
Figure 2:
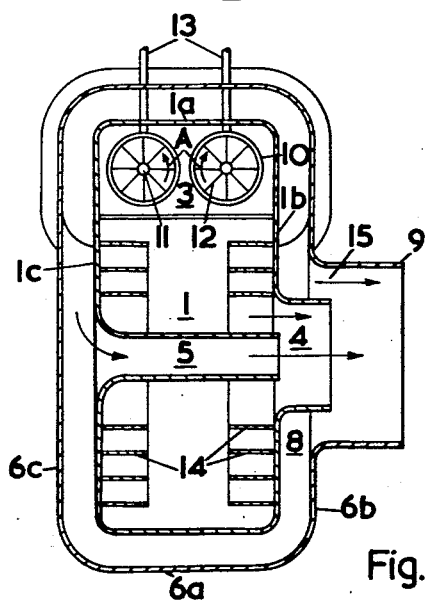
FIGURE 2 is a sectional view of a combustion chamber of FIGURE 1, taken on the line II—II.

In FIGURES 1 and 2, combustion apparatus of the spiral vortex type comprises a vortex combustion chamber 1, defined by a peripheral wall 1*a* of spiral shape, and side walls 1*b* and 1*c*. The peripheral wall is formed with a generally tangentially facing air inlet 2, from which extends a generally tangential inlet duct 3, which as shown in FIGURE 2, is generally rectangular in shape, its width, i.e., its dimension parallel to the vortex chamber axis, being greater than its depth. One of the side walls 1*b* is formed with a central axially directed combustion gas outlet 4 on the axis of the chamber, while the other side wall 1*c* is similarly formed with a central aperture from which an open ended tube 5 extends along the axis of the chamber in the direction of the outlet 4.

The vortex chamber 1 is enclosed by an outer casing 6, comprising a spiral peripheral wall 6*a*, and side walls 6*b* and 6*c*, and the inlet duct is similarly enclosed by the generally tangential extension 7 of the casing. The side wall 6*b* of the casing has a central outlet 8 on its axis from which extends an axial outlet duct 9 around the outlet 4 of the vortex chamber 1.

Within the inlet duct 3 are two pre-combustion chambers in the form of tubular flame tubes 10 mounted side by side, each flame tube having open inlet and outlet ends and further openings in its wall for the admission of secondary and/or cooling air. Fuel, which may be heavy, e.g., residual, fuel oil, or pulverised solid fuel, such as coal, is injected into the flame tubes by means of fuel injectors 11 supported in the inlet ends thereof by swirlers 12 and supplied through pipes 13. These swirlers consist of rows of vanes arranged to produce in the air streams passing therethrough a swirling motion about the axis of the flame tubes, and, as will be explained below, these swirls are of opposite hands.

The side walls 1b and 1c of the vortex chamber are each provided with a set of three vanes 14 projecting axially therefrom into the interior of the chamber. These vanes extend along spirals of the same spiral angle as the peripheral wall 1a but of smaller generating radii, their upstream end edges being spaced evenly across the inlet 2 to the vortex chamber, and they extend from the inlet 2 to the region of the outlet 4. They thus extend along and substantially conform to the spiral path of the design flow from inlet 2 to outlet 4.

In an alternative arrangement, the vanes 14 may be discontinuous, e.g., they may consist of a number of individual vanes spaced from one another along the spirals. Each individual vane will have its span, i.e. its dimension measured parallel to the vortex chamber axis, equal to its chord, i.e. its dimension measured along the spiral, and to the spacing of the vanes along the spiral.

In operation air is supplied, e.g., from the compressor of the gas turbine plant, to the extension 7 of the casing 6 and hence to the inlet duct 3 of the vortex chamber. Some of the air enters the flame tubes 10 through the swirlers 12, and the fuel from injectors 11 is injected into and ignited in the stabilised combustion zones formed by the swirlers. The fuel particles are partly burnt in the flame tubes and the burning particles, together with the excess air, pass into the vortex chamber 1, and continue to burn therein as they are carried around the chamber axis. Each particle moves in an equilibrium path, under the joint action of centrifugal force and the radially inwardly drag force caused by the inward movement of the air. The chamber is so designed that as the particle burns away, and its mass consequently decreases, it progressively approaches the outlet 4, and by the time it reaches the outlet it is substantially completely burnt, or in the case of apparatus in accordance with the above-mentioned co-pending applications, burnt away to some predetermined extent. The combustion gases are discharged through the outlet 4.

Some of the air supplied to the extension 7 passes into the outer casing 6. This air flows around the outside of the combustion chamber 1, and part flows through the tube 5, and the remainder through the gap 15 around the chamber outlet 4, to mix with the combustion gases in the outlet duct 9, the combustion gases and air being then supplied to drive the turbine. It is to be noted that the central stream of air from the tube 5 serves to counteract any tendency to reverse flow along the outlet duct caused by the swirling exhaust gases discharged from the combustion chamber, which reverse flow might give rise to secondary flows in the outlet region of the combustion chamber.

As mentioned above, non-uniformity of velocity profile and consequent secondary flows are liable to develop in a combustion chamber of the type described, but it is found that the vanes 14 tend to reduce such flows and substantially eliminate any reverse flows except possibly in the region of the outlet. It appears that the vanes produce this effect by reducing the slowing down of the flow adjacent the side walls of the chamber. It is necessary that the vanes shall project across the chamber for a substantial part of its width. In the arrangements shown, the vanes on each side of the chamber extend across approximately one third of the chamber width.

The swirlers 12 which, as previously pointed out, are of opposite hands, give rise to two oppositely swirling gas streams entering the vortex chamber, and it is found that such an arrangement tends to give a more uniform velocity profile across the chamber in its peripheral region, so that the onset of secondary flows is delayed. The swirlers may be arranged so that the flow is outwards at the centre of the inlet duct and inwards by the side walls as indicated by the arrows A in FIGURE 2 or vice versa.

In a vortex combustion chamber of metal construction, the vane 14 may be sheet metal strips, and in a chamber with a ceramic lining they may be integral with the lining.

The embodiment of FIGURES 3 and 4 is generally the same as that of FIGURES 1 and 2, and the same reference numerals have been used for corresponding parts. However the vanes 14 are dispersed with, and instead, the chamber is provided with a row of vanes 16 disposed around the outlet 4 and extending across the full width of the chamber between the side walls 1b and 1c. The vanes are arranged to lie along the spiral flow path of the air to the outlet, and may be curved as shown to conform to this path, though, as their chord is comparatively short, this may be unnecessary. These vanes tend to produce between them minor secondary flows which at the outlets of the vanes have velocity components opposed to those of the secondary flows which arise in the region of the chamber outlet, in which region secondary flow is most likely to occur.

In the embodiment just described, the downstream ends portions 10a of the flame tubes 10 change in shape from circular to rectangular to conform to the rectangular inlet 2 to the vortex combustion chamber. The vanes 15 may be hollow with their interiors in communication with the space between the vortex chamber 1 and casing 6 so that cooling air may be passed therethrough, and they may further have air-permeable surfaces so that the air may be discharged therethrough to effect sweat or effusion cooling of the vanes. In this way, it may be possible to reduce the risk of deposition of ash and unburnt fuel on the vanes.

It is also found that more uniform velocity profiles at the peripheral region of the chamber can be promoted and the tendency for secondary flows to be set up can be reduced by increasing the number of peripheral inlets. An application of this aspect of the invention is shown in FIGURE 5 which represents a vortex combustion chamber 21 having a peripheral wall made up in three spirally shaped sections 22 defining between them three generally tangentially facing inlets 23 to which air is supplied through three tangentially extending inlet ducts 24. Flame tubes 10 with fuel injectors and swirlers as in the embodiment of FIGURES 1 and 2 are provided in each duct 24. Each side wall of the chamber is provided with three spirally extending vanes 25, similar to the vanes 14 in the embodiment of FIGURES 1 and 2, but in this case the vanes extend one from each inlet 23 to the central outlet 26. The chamber may be enclosed by an outer casing and the three inlet ducts 24 connected to a common supply of air as in said British patent specifications Nos. 719,379 and 719,380 or said co-pending applications.

In the embodiments described the side walls of the vortex chamber are parallel, but the walls might be frusto-conical so that the chamber is wider at the centre than at the periphery as in the various specifications and applications referred to above.

The various features described above may be used in combination. Thus a vortex combustion chamber may have spirally extending vanes projecting from the side walls and extending from the peripheral inlet or inlets to the outlets, which vanes may extend across the full width of the chamber around the outlet, and to delay the formation of secondary flows near the chamber periphery there may be a plurality of air inlets in each of which there are two oppositely handed swirlers mounted side by side.

Another method of reducing the tendency to secondary flow in the peripheral part of the chamber is by providing for a low velocity core in the centre of the stream entering the chamber. Thus there may be a gauze extending across the inlet to the chamber with its central part of finer mesh than its outer part. Such an arrangement is not necessarily suitable for use in a combustion chamber but may be of use in vortex chambers for carrying out other reaction processes.

We claim:

1. A spiral vortex reaction chamber comprising a curved peripheral wall and two side walls, said peripheral wall being formed with a generally tangentially facing inlet and having a generally tangential extension therefrom defining an inlet duct for leading a fluid stream to said inlet and one of said side walls being formed with a central outlet on the axis of the chamber, the walls thus defining a spiral vortex path for the fluid stream inwardly from said inlet to said outlet, means for introducing a reactant into said duct upstream of said inlet and a plurality of vanes for reducing secondary flow projecting axially from at least one of said side walls into the interior of chamber and extending along at least part of said spiral vortex path, and arranged to leave a clear space extending centrally between said side walls from said peripheral wall for at least part of the radial extent of the chamber towards the axis of the chamber, the inner edges of said vanes being positioned as near to the axis of the chamber as the outer edge of the outlet.

2. A spiral vortex reaction chamber according to claim 1 wherein the vanes extend continuously from said inlet to said outlet.

3. A spiral vortex reaction chamber comprising a curved peripheral wall and two side walls, said peripheral wall being formed with a generally tangentially facing inlet and having a generally tangential extension therefrom defining an inlet duct for leading a fluid stream to said inlet and one of said side walls being formed with a central outlet on the axis of the chamber, the walls thus defining a spiral vortex path for the fluid stream inwardly from said inlet to said outlet, means for introducing a reactant into said duct upstream of said inlet, and a plurality of vanes for reducing secondary flows projecting axially from each said side wall into the interior of the chamber and extending along said spiral vortex path, from said inlet to said outlet, the vanes on opposite side walls being spaced from one another to leave between them a clear space extending from said peripheral wall to the axis of the chamber, the inner edges of said vanes being positioned as near to the axis of the chamber as the outer edge of the outlet.

4. A spiral vortex reaction chamber according to claim 3 wherein each said vane projects across said chamber for at least one third of its width.

5. A spiral vortex reaction chamber comprising a curved peripheral wall and two side walls, said peripheral wall being formed with a generally tangentially facing inlet and having a generally tangential extension therefrom defining an inlet duct for leading a fluid stream to said inlet and one of said side walls being formed with a central outlet on the axis of the chamber, the walls thus defining a spiral vortex path for the fluid stream inwardly from said inlet to said outlet, and a row of vanes around said outlet for reducing secondary flows, extending across the full width of the chamber between said side walls and along said spiral vortex path, said vanes having their radially outer edges spaced radially inwardly from said peripheral wall and their radially inner edges positioned as near to the chamber axis as the outer edge of the outlet.

6. A spiral vortex reaction chamber comprising a curved peripheral wall and two side walls, said peripheral wall being formed with a plurality of generally tangentially facing inlets and having a plurality of generally tangential extensions therefrom defining inlet ducts for leading fluid streams to said inlets and one of said side walls being formed with a central outlet on the axis of the chamber, the walls thus defining spiral vortex paths for the fluid stream from each said inlet to said outlet, means for introducing a reactant into each of said ducts upstream of said inlets, and a plurality of vanes for reducing secondary flows projecting from at least one of said side walls into the interior of the chamber and extending one from each of said inlets along said spiral vortex paths to said outlet, and arranged to leave a clear space extending centrally between the side walls from said peripheral wall for at least part of the radial extent of the chamber towards the axis of the chamber, the inner edges of said vanes being positioned as near to the axis of the chamber as the outer edge of the outlet.

References Cited in the file of this patent

UNITED STATES PATENTS

| 2,089,329 | Beck | Aug. 10, 1937 |
| 2,523,462 | Clausen et al. | Sept. 26, 1950 |
| 2,577,918 | Rowe | Dec. 11, 1951 |
| 2,692,479 | Lloyd | Oct. 26, 1954 |
| 2,706,150 | Lloyd | Apr. 12, 1955 |

FOREIGN PATENTS

| 142,522 | Australia | July 30, 1951 |
| 719,380 | Great Britain | Dec. 1, 1954 |